United States Patent
Hofmann et al.

(10) Patent No.: US 6,858,655 B1
(45) Date of Patent: Feb. 22, 2005

(54) HIGH-RESILIENT POLYURETHANE FOAMS PRODUCED FROM POLYETHER POLYOLS

(75) Inventors: Jörg Hofmann, Krefeld (DE); Pramod Gupta, Bedburg (DE); Manfred Dietrich, Frankfurt (DE); Hansjürgen Rabe, Leverkusen (DE); Jürgen Grönen, Overath (DE); Pieter Ooms, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 30 days.

(21) Appl. No.: 10/018,332

(22) PCT Filed: Jun. 6, 2000

(86) PCT No.: PCT/EP00/05167

§ 371 (c)(1),
(2), (4) Date: Dec. 13, 2001

(87) PCT Pub. No.: WO00/78837

PCT Pub. Date: Dec. 28, 2000

(30) Foreign Application Priority Data

Jun. 19, 1999 (DE) ......................................... 199 28 156

(51) Int. Cl.$^7$ .............................................. C08G 18/28
(52) U.S. Cl. ....................................................... 521/174
(58) Field of Search ........................................ 521/174

(56) References Cited

U.S. PATENT DOCUMENTS

| | | | | |
|---|---|---|---|---|
| 3,427,256 A | 2/1969 | Milgrom | ...................... | 252/431 |
| 3,427,334 A | 2/1969 | Belner | ........................ | 260/429 |
| 3,427,335 A | 2/1969 | Herold | ........................ | 260/429 |
| 5,627,120 A | 5/1997 | Le-Khac | ...................... | 502/156 |
| 5,648,559 A | 7/1997 | Hager | ........................ | 568/620 |
| 5,668,191 A | 9/1997 | Kinkelaar et al. | .......... | 521/174 |
| 5,689,012 A | 11/1997 | Pazos et al. | ................ | 568/619 |
| 5,714,428 A | 2/1998 | Le-Khac | ...................... | 502/159 |
| 5,783,513 A | 7/1998 | Combs et al. | .............. | 502/175 |
| 5,958,994 A | 9/1999 | Lear et al. | .................. | 521/174 |
| 6,008,263 A * | 12/1999 | Thompson et al. | .......... | 521/174 |
| 6,066,683 A * | 5/2000 | Beisner et al. | .............. | 521/174 |
| 6,291,388 B1 | 9/2001 | Hofmann et al. | ........... | 502/154 |
| 6,323,375 B1 | 11/2001 | Hofmann et al. | ........... | 568/613 |
| 2002/0068812 A1 | 6/2002 | Hofmann et al. | ........... | 528/415 |

FOREIGN PATENT DOCUMENTS

| | | |
|---|---|---|
| DE | 2 711 735 | 9/1977 |
| DE | 203 735 | 11/1983 |
| DE | 197 57 574 | 6/1999 |
| DE | 198 17 676 | 10/1999 |
| EP | 0 761 708 | 3/1997 |
| EP | 0 700 949 | 3/1999 |

OTHER PUBLICATIONS

Reaction Polymers, Hanser–Verlag, Munich, (month unavailable) 1992, pp. 75–96, Wilson F. Gum, Wolfram Riese and Henri Ulrich, Polyurethanes, Expoxies, Unsaturated Polyesters, Phenolics, Special Monomers, and Additives.

* cited by examiner

Primary Examiner—John M. Cooney, Jr.
(74) Attorney, Agent, or Firm—Joseph C. Gil; Lyndanne M. Whalen

(57) ABSTRACT

Flexible polyurethane foams are produced from a polyisocyanate and a polyether polyol which has been alkoxylated in the presence of a double metal cyanide catalyst and that has at least one ethylene oxide-propylene oxide mixed block.

4 Claims, 3 Drawing Sheets

Flow resistance measurement apparatus

Hose length ca. 1.8 m
Hose internal ⌀ 12 mm

Glass vessel for flow resistance measurement apparatus

Measuring head for flow resistance measurement apparatus

HIGH-RESILIENT POLYURETHANE FOAMS PRODUCED FROM POLYETHER POLYOLS

BACKGROUND OF THE INVENTION

The invention relates to flexible polyurethane foams that have been produced from polyisocyanates and polyether polyols in the presence of double metal cyanide (DMC) catalysts and that have at least one ethylene oxide-propylene oxide mixed block, as well as a process for their production.

The expression flexible polyurethane foams denotes foams that exert a small resistance to a pressure stress and that are open-cell, air-permeable and that can be reversibly deformed. The properties of flexible polyurethane foams substantially depend on the structure of the polyether polyols, polyisocyanates and additives such as catalysts and stabilisers that are used in their production. As regards the polyethers, the functionality, chain length as well as the epoxides used and the resultant reactivity of the hydroxyl groups have the greatest influence on the characteristics of the foam.

The production of polyether polyols is mostly carried out by base-catalysed polyaddition of alkylene oxides to polyfunctional starter compounds such as for example alcohols, acids, amines, etc. (see for example Gum, Riese & Ulrich (Editors): "Reaction Polymers", Hanser Verlag, Munich 1992, pp. 75–96). After completion of the polyaddition the catalyst is removed from the polyether polyol in a very complicated process, for example by neutralisation, distillation and filtration. The long-chain polyethers have to be freed particularly carefully from catalyst residues since otherwise undesirable secondary reactions such as for example the formation of polyisocyanurates, may take place during the foaming. The residual content of potassium and sodium ions in the polyether polyol amounts to only a few ppm. Only polyether polyols with a very low alkali metal content are suitable for the production of polyurethane elastomers and flexible polyurethane foams. The polyether polyols produced by base catalysis also have the disadvantage that with increasing chain length, the content of monofunctional polyethers (so-called monools) constantly increases and the functionality decreases.

In order to circumvent the aforementioned disadvantage, it is recommended in the field of polyurethane elastomers to employ polyether polyols that are produced by using double metal cyanide (DMC) catalysts, and that accordingly have very low contents of allyl ethers (monools) and thus exhibit a higher functionality. Such production processes have been known since the 1960s (U.S. Pat. No. 3,427,256, U.S. Pat. No. 3,427,334, U.S. Pat. No. 3,427,335). The disadvantage of this production method is however the very complicated and expensive removal of the catalysts.

In more recent patent applications (for example EP-A 700 949, EP-A 761 708, WO 97/40086, WO 98/16310, DE-A 19 745 120, DE-A 19 757 574, DE-A 198 102 269) highly active improved DMC catalysts are described, which on account of their very high activity can be used in such small amounts (catalyst concentration $\leq 50$ ppm) that a separation of the catalyst from the polyether polyol is no longer necessary. In this way a more economic production of the polyether polyols is possible compared to the conventional base-catalysed process. These products may be used directly for the production of polyurethane elastomers.

The disadvantage however is that conventional, low molecular weight starter compounds such as for example propylene glycol, glycerol and trimethylolpropane cannot in general be alkoxylated with DMC catalysts. The DMC catalysts therefore in general require the use of oligomeric propoxylated starter compounds that are obtained beforehand from the aforementioned low molecular weight starters, for example by conventional alkali catalysis (generally with KOH), followed by complicated working-up, by for example neutralisation, distillation and filtration.

German patent application 198 17 676.7 describes a process for the production of long-chain polyether polyols that is completely free of any working-up stage, in which first of all the pre-propoxylated starter compounds are obtained by catalysis with perfluoroalkyl sulfonates (preferably triflates) of metals of Group III A of the Periodic System of the Elements (corresponding to the 1970 IUPAC Convention), which are then converted without separation of the catalyst and working-up, by means of highly active DMC catalysts into long-chain, high molecular weight polyether polyols. An extremely economical production of long-chain polyether polyols is possible in this way.

The disadvantage however is that poly(oxypropylene) polyols that can be produced very economically by these highly active DMC catalysts without any separation of the DMC catalyst are not suitable for the production of flexible polyurethane foams. The use of such polyether polyols in flexible foam formulations leads to serious crack formation.

SUMMARY OF THE INVENTION

It has now been found that polyether polyols that are outstandingly suitable for the production of flexible polyurethane foams are obtained by the DMC-catalysed incorporation of ethylene oxide/propylene oxide mixed blocks. The mixed blocks are either added directly to the pre-propoxylated starter compounds up to the end of the chain, or are added only after a propylene oxide block. In both cases a terminal propylene oxide block can also be added.

Such polyether polyols may also be used without the co-use of filler-containing polyols such as for example polymer polyols (styrene-acrylonitrile copolymers) or polyurea dispersion polyols, etc., and without modified polyisocyanates such as for example allophanate polyisocyanates, biuret polyisocyanates, for the production of flexible polyurethane foams. Traces of catalyst do not in this case exert any negative influence.

DETAILED DESCRIPTION OF THE INVENTION

Figure 1:
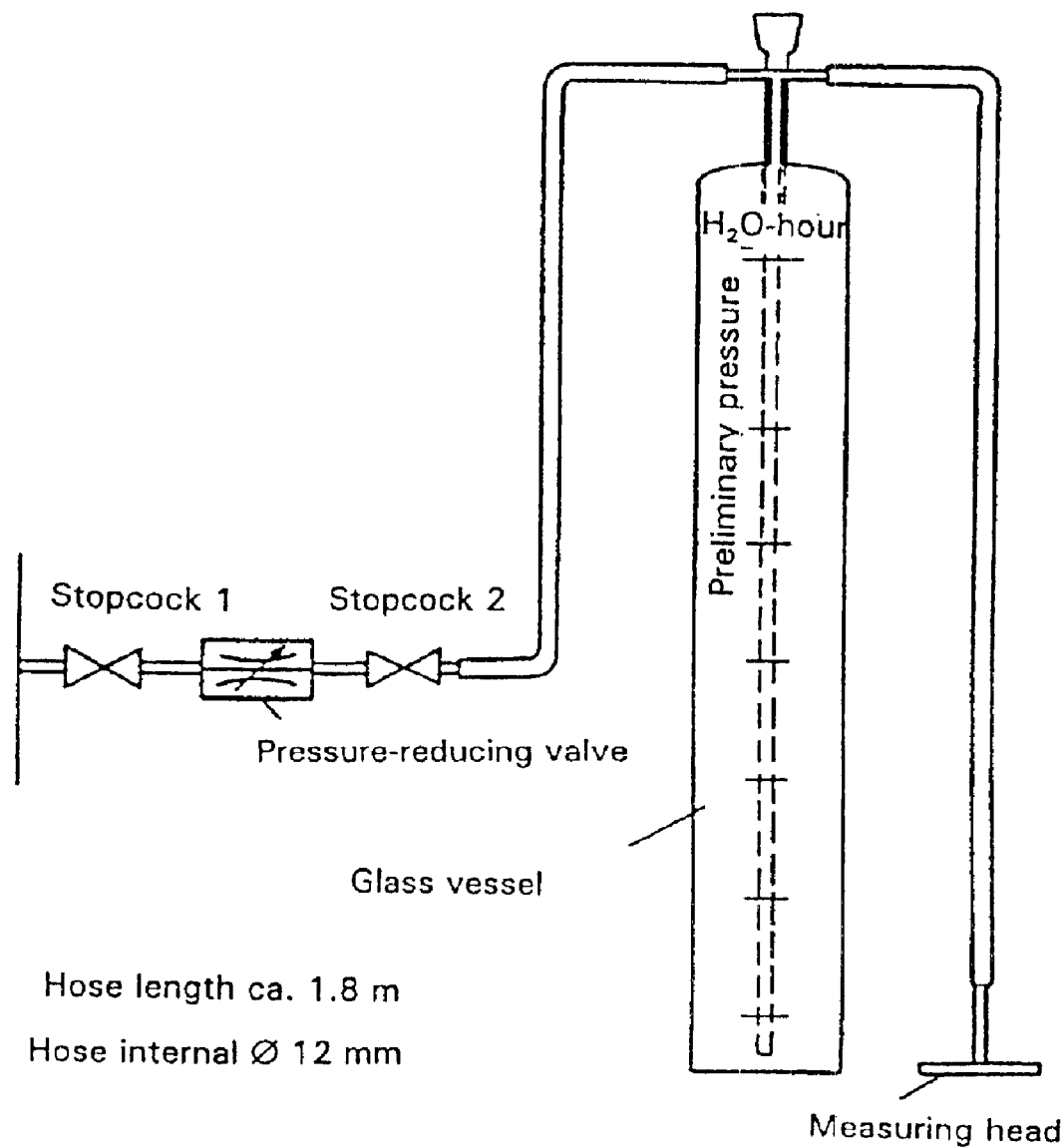
FIG. 1 illustrates the apparatus used to determine the air permeability of the foam produced in Example 12.

The invention accordingly provides flexible polyurethane foams of polyisocyanates and long-chain polyether polyols that are produced by DMC catalysis without separation of the catalyst, that have at least one ethylene oxide/propylene oxide mixed block, and that also have a number average molecular weight between 700 and 15,000 g/mole, as well as a process for their production.

Suitable as polyisocyanates are aliphatic, cycloaliphatic, araliphatic, aromatic and heterocyclic polyisocyanates, such as are described in Justus Liebigs Annalen der Chemie 562 (1949) 75, for example those of the formula

in which
n is an integer from 2 to 4, preferably 2, and
Q denotes an aliphatic hydrocarbon radical with 2 to 18, preferably 6 to 10 C atoms, a cycloaliphatic hydrocarbon radical with 4 to 15, preferably 5 to 10 C atoms, an aromatic hydrocarbon radical with 6 to 15, preferably 6 to 13 C atoms, or an araliphatic hydrocarbon radical with 8 to 15, preferably 8 to 13 C atoms.

Preferred are polyisocyanates such as are described in DE-OS 2 832 253. As a rule it is particularly preferred to use the technically easily accessible polyisocyanates, for example 2,4-toluylene diisocyanate and 2,6-toluylene diisocyanate as well as arbitrary mixtures of these isomers ("TDI"), polyphenyl-polymethylene polyisocyanates, such as are produced by aniline-formaldehyde condensation followed by phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates that are derived from 2,4-toluylene diisocyanate and/or 2,6-toluylene diisocyanate or from 4,4'-diphenylmethane diisocyanate and/or 2,4'-diphenylmethane diisocyanate.

The production of the long-chain polyether polyols that are used in the process according to the invention is carried out by means of DMC-catalysed polyaddition of alkylene oxides to starter compounds containing active hydrogen atoms.

Suitable DMC catalysts are in principle known and are described in detail in the prior art listed above. There are preferably used improved, highly active DMC catalysts that are described for example in EP-A 700 949, EP-A 761 708, WO 97/40086, WO 98/16310, DE-A 197 45 120, DE-A 197 57 574 and DE-A 198 102 269. A typical example are the highly active DMC catalysts described in EP-A 700 949 that contain, in addition to a double metal cyanide compound (for example zinc hexacyanocobaltate(III)) and an organic complex ligand (for example tert.-butanol), also a polyether with a number average molecular weight of greater than 500 g/mole.

As starter compounds with active hydrogen atoms there are preferably used compounds with (number average) molecular weights of 18 to 2,000 g/mole and with 1 to 8 hydroxyl groups. By way of example there may be mentioned butanol, ethylene glycol, diethylene glycol, triethylene glycol, 1,2-propylene glycol, 1,4-butanediol, 1,6-hexanediol, bisphenol A, trimethylolpropane, glycerol, pentaerythritol, sorbitol, cane sugar, degraded starch or water.

It is more advantageous to use those starter compounds with active hydrogen, atoms that have been produced beforehand from the aforementioned low molecular weight starter compounds and that form oligomeric alkoxylation products with (number average) molecular weights of 200 to 2,000 g/mole. Preferably oligomeric propoxylated starter compounds are used having 1 to 8 hydroxyl groups, particularly preferably 2 to 6 hydroxyl groups, and (number average) molecular weights of 200 to 2,000 g/mole.

The production of these oligomeric propoxylated starter compounds from the low molecular weight starters may be carried out for example by conventional alkali catalysis (e.g. with KOH) followed by working-up by for example neutralisation, distillation and filtration, or as described in German patent application 198 17 676.7 by catalysis with perfluoroalkyl sulfonates of metals of Group III A of the Periodic System of the Elements (corresponding to the 1970 IUPAC Convention), without subsequent separation of the catalyst.

The further alkoxylation is then carried out with highly active DMC catalysts. According to the invention the pre-propoxylated starter compound is converted by means of DMC catalysis either with an EO/PO mixed block in a weight ratio of 2/98 to 90/10, or is further propoxylated and then reacted either with an EO/PO mixed block in a weight ratio of 2/98 to 90/10, or is first of all reacted with an EO/PO mixed block in a weight ratio of 2/98 to 90/10 and at the end is reacted once more with a PO block, or is further propoxylated and then reacted with an EO/PO mixed block in a weight ratio of 2/98 to 90/10 and at the end is reacted once more with a PO block.

The DMC-catalysed alkoxylation is generally carried out at temperatures of 20 to 200° C., preferably in the range from 40 to 180° C., particularly preferably at temperatures of 50 to 150° C. The reaction may be carried out at total pressures of 0.001 to 20 bar. The polyadditon may be carried out in bulk or in an inert, organic solvent such as toluene and/or THF. The amount of solvent is normally 10 to 30 wt. % referred to the amount of the polyether polyol to be produced. The polyaddition may be carried out continuously or batchwise, for example in a batch or in a semi-batch process.

The weight ratios of the EO/PO mixed blocks to be reacted is 2/98 to 90/10, preferably 5/95 to 80/20. The length of the EO/PO mixed blocks as well as of the pure PO blocks that are built up by means of DMC catalysis is in each case 1 to 1,000 alkylene oxide units, preferably 2 to 500 alkylene oxide units, and particularly preferably 3 to 200 alkylene oxide units.

If the polyether polyols produced by DMC catalysis have a terminal EO/PO mixed block, then these are preferably produced with an ethylene oxide/propylene oxide mixture in an EO:PO weight ratio of 40:60 to 95:5, preferably 50:50 to 90:10, particularly preferably 60:40 to 90:10. In such polyether polyols the proportion of primary OH groups is preferably 40 to 95 mole %, particularly preferably 50 to 90 mole %; the total content of oxyethylene units in the polyether polyol is preferably >25 wt. %, particularly preferably >30 wt. %, most particularly preferably >35 wt. %.

The number average molecular weights of the long-chain polyether polyols that are used according to the invention for the production of flexible polyurethane foams are 700 to 50,000 g/mole, preferably 1,000 to 30,000 g/mole, and particularly preferably 1,500 to 20,000 g/mole.

The concentration of the highly active DMC catalysts is 5 to 100 ppm, preferably 10 to 75 ppm and particularly preferably 15 to 50 ppm, referred to the amount of the polyether polyol to be produced. On account of the very low catalyst concentration the polyether polyols may be used without separation of the catalyst for the production of flexible polyurethane foams without the product qualities being adversely affected.

In addition to the aforedescribed long-chain polyether polyols produced by DMC catalysis without separation of the catalyst, further compounds containing hydroxyl groups (polyols) may be used in the polyol formulation for the production of the flexible polyurethane foams according to the invention. These polyols known per se are described in detail for example in Gum, Riese & Ulrich (Editors): "reaction Polymers", Hanser Verlag, Munich 1992, pp. 66–96, and G. Oertel (Editor): "Kunststoffhandbuch, Vol. 7, Polyurethanes", Hanser Verlag, Munich 1993, pp. 57–75. Examples of suitable polyols may be found in the aforementioned literature citations as well as in U.S. Pat. No. 3,652,639, U.S. Pat. No. 4,421,872 and U.S. Pat. No. 4,310,632.

Preferably used polyols are polyether polyols (in particular poly(oxyalkylene)polyols) and polyester polyols.

The production of the polyether polyols is carried out according to known methods, preferably by base-catalysed polyaddition of alkylene oxides to polyfunctional starter compounds containing active hydrogen atoms, such as for example alcohols or amines. The following may be mentioned by way of example: ethylene glycol, diethylene glycol, 1,2-propylene glycol, 1,4-butanediol, hexamethylene glycol, bisphenol A, trimethylolpropane, glycerol, pentaerythritol, sorbitol, cane sugar, degraded starch, water, methylamine, ethylamine, propylamine, butylamine, aniline, benzylamine, o- and p-toluidine, α, β-naphthylamine, ammonia, ethylenediamine, propylenediamine, 1,4-butylenediamine, 1,2-, 1,3-, 1,4-, 1,5-, and/or 1,6-hexamethylendiamine, o-, m-, and p-phenylenediamine, 2,4-, 2,6-toluylenediamine, 2,2'-, 2,4- and 4,4'-diaminodiphenylmethane and diethylenediamine.

As alkylene oxides there are preferably used ethylene oxide, propylene oxide, butylene oxide as well as their mixtures. The build-up of the polyether chains by alkoxylation may be carried out not only with one monomeric epoxide, but also statistically or also blockwise with two or three different monomeric epoxides.

Processes for the production of such polyether polyols are described in "Kunststoffhandbuch, Vol. 7, Polyurethanes", in "Reaction Polymers" as well as for example in U.S. Pat. No. 1,922,451, U.S. Pat. No. 2,674,619, U.S. Pat. No. 1,922,459, U.S. Pat. No. 3,190,927 and U.S. Pat. No. 3,346,557.

Methods for the production of polyester polyols are also well known and are described for example in the two aforementioned literature citations ("Kunststoffhandbuch, Vol. 7, Polyurethanes", and "Reaction Polymers"). The polyester polyols are produced inter alia by polycondensation of polyfunctional carboxylic acids or their derivatives, such as for example acid chlorides or anhydrides, with polyfunctional hydroxyl compounds.

As polyfunctional carboxylic acids there may for example be used: adipic acid, phthalic acid, isophthalic acid, terephthalic acid, oxalic acid, succinic acid, glutaric acid, azelaic acid, sebacic acid, fumaric acid or maleic acid.

As polyfunctional hydroxyl compounds there may for example be used: ethylene glycol, diethylene glycol, triethylene glycol, 1,2-propylene glycol, dipropylene glycol, 1,3-butanediol, 1,4-butanediol, 1,6-hexanediol, 1,12-dodecanediol, neopentyl glycol, trimethylolpropane, triethylolpropane or glycerol.

The production of the polyester polyols may furthermore also be carried out by ring-opening polymerisation of lactones (e.g. caprolactone) with diols and/or triols as starters.

In addition a crosslinking component may be added in the production of the flexible polyurethane foams according to the invention. Crosslinking components that may be used are for example diethanolamine, triethanolamine, glycerol, trimethylolpropane (TMP), adducts of such crosslinking compounds with ethylene oxide and/or propylene oxide with an OH number<1,000, or also glycols with a number average molecular weight of $\leq$1,000. Particularly preferred are triethanolamine, glycerol, TMP or low molecular weight EO and/or PO adducts thereof.

In addition auxiliary substances and additives and/or flame retardants known per se may also optionally be added as further components. In this connection auxiliary substances are understood to mean in particular catalysts and stabilisers known per se. Melamine may for example be used as flame retardant.

Catalysts that may optionally be added are known per se. By way of example there may be mentioned tertiary amines such as triethylamine, tributylamine, N-methylmorpholine, N-ethylmorpholine, N,N,N',N'-tetramethylethylenediamine, pentamethyldiethylenetriamine and higher homologues (DE-A 26 24 527 and DE-A 26 24 528), 1,4-diaza-bicyclo[2,2,2]octane, N-methyl-N'-dimethylaminoethyl-piperazine, bis(dimethylaminoalkyl)piperazines (DE-A 26 36 787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethylimidazole, 2-methylimidazole, monocyclic and bicyclic amidines (DE-A 17 20 633), bis(dialkylamino)alkyl ethers (U.S. Pat. No. 3,330,782, DE-A 10 30 558, DE-A 18 04 361 and DE-A 26 18 280) as well as tertiary amines containing amide groups (preferably formamide groups) according to DE-A 25 23 633 and DE-A 27 32 292. Also suitable as catalysts are Mannich bases known per se formed from secondary amines, for example dimethylamine, and aldehydes, preferably formaldehyde, or ketones such as acetone, methyl ethyl ketone or cyclohexanone, and phenols such as phenol, nonyl phenol or bisphenols. Tertiary amines having hydrogen atoms active with respect to isocyanate groups and that may be used as catalyst are for example triethanolamine, triisopropanolamine, N-methyldiethanol amine, N-ethyldiethanolamine. N,N-dimethylethanolamine, their reaction products with alkylene oxides such as propylene oxide and/or ethylene oxide, as well as secondary-tertiary amines according to DE-A 27 32 292. Also suitable as catalysts are silaamines with carbon-silicon bonds, such as are described for example in DE-A 12 29 290, for example 2,2,4-triethyl-2-silamorpholine and 1,3-diethylaminomethyltetramethyldisiloxane. There may also be used as catalysts nitrogen-containing bases such as teta-alkylammonium hydroxides, as well as alkali metal hydroxides such as sodium hydroxide, alkali metal phenolates such as sodium phenolate, or alkali metal alcoholates such as sodium methylate. Hexahydrotriazines may also be used as catalyst (DE-A 17 69 043). The reaction between NCO groups and Zerewitinoff-active hydrogen atoms is also greatly accelerated by lactams and azalactams, an associate between the lactam and the compound containing acidic hydrogen first of all being formed. Such associates and their catalytic action are described in DE-A 20 62 286, DE-A 20 62 289, DE-A 21 17 576, DE-A 21 29 198, DE-A 23 30 175 and DE-A 23 30 211. According to the invention organometallic compounds, in particular organic tin compounds, may also be used as catalysts. As organic tin compounds there may be used, in addition to sulfur-containing compounds such as di-n-octyltin mercaptide (DE-A 17 69 367; U.S. Pat. No. 3,645,927), preferably tin(II) salts of carboxylic acids such as tin(II)acetate, tin(II)octoate, tin(II) ethylhexanoate and tin(II)laurate, and tin(W) compounds, for example dibutyltin oxide, dibutyltin dichloride, dibutyltin diacetate, dibutyltin dilaurate, dibutyltin maleate or dioctyltin diacetate. Obviously all of the aforementioned catalysts may be used in the form of mixtures. Of particular interest in this connection are combinations of organometallic compounds and amidines, aminopyridines or hydrazinopyridines (DE-A 24 34 185, DE-A 26 01 082 and DE-A 26 03 834). So-called polymeric catalysts such as are described in DE-A 42 18 840 may furthermore be used as catalysts. These catalysts are reaction products, present in the form of alkali metal salts, of trifunctional or higher functional alcohols with (number average) molecular weights of 92 to 1,000 with intramolar carboxylic acid anhydrides. The reaction products have (statistical average) at least 2, preferably 2 to 5 hydroxyl groups, and at least 0.5, preferably 1.0 to 4 carboxylate groups, the counterions to the carboxylate groups being alkali cations. The "reaction products" of the starting components may, as is evident from the content of carboxylate groups, also be mixtures of true reaction products with excess amounts of alcohols. Suitable polyhydric alcohols for the production of the reaction products are for example glycerol, trimethylolpropane, sorbitol, pentaerythritol, mixtures of such polyhydric alcohols, alkoxylation products of alcohols with (number average) molecular weights of 92 to 1,000 of such polyhydric alcohols or of mixtures of such alcohols, wherein in the alkoxylation propylene oxide and/or ethylene oxide may be used in arbitrary sequence or as a mixture, though preferably exclusively propylene oxide is used. Suitable intramolecular carboxylic acid anhydrides for the production of the reaction product are for example maleic anhydride, phthalic anhydride, hexahydrophthalic anhydride, succinic anhydride, pyromellitic anhydride or arbitrary mixtures of such anhydrides. It is particularly preferred to use maleic anhydride. Further examples of catalysts that may be used as well as details of the mode of action of the catalysts are described in Vieweg und Höchtlen (Editors): Kunststoff-Handbuch, Vol. VII, Carl-Hanser-Verlag, Munich 1966, pp. 96–102.

The catalysts are as a rule used in amounts of about 0.001 to 10 wt. %, referred to the total amount of compounds having at least two hydrogen atoms reactive with respect to isocyanates.

Further additives that may optionally be used are surface-active additives such as emulsifiers and foam stabilisers. Suitable emulsifiers are for example the sodium salts of castor oil sulfonates or salts of fatty acids with amines such as oleic acid diethylamine or stearic acid diethanolamine. Alkali metal salts or ammonium salts of sulfonic acids, such as for example of dodecylbenzenesulfonic acid or dinaphthylmethanedisulfonic acid or of fatty acids such as castor oil acid or of polymeric fatty acids may also be co-used as surface-active additives.

As foam stabilisers there may be used in particular polyether siloxanes, especially water-soluble examples. These compounds are generally synthesised in such a way that a copolymer of ethylene oxide and propylene oxide is joined to a polydimethylsiloxane radical. Such foam stabilisers are described for example in U.S. Pat. No. 2,834,748, U.S. Pat. No. 2,917,480 and U.S. Pat. No. 3,629,308. Of particular interest are polysiloxane-polyoxyalkylene copolymers multiply branched via allophanate groups, according to DE-A 25 58 523.

Further possible additives are reaction retardants, for example acid-reacting substances such as hydrochloric acid or organic acid halides, also cell regulators known per se such as paraffins or fatty alcohols or dimethylpolysiloxanes, as well as pigments, dyes and flame retardants known per se, for example trichloroethyl phosphate, tricresyl phosphate or ammonium phosphate and ammonium polyphosphate, furthermore stabilisers against the effects of ageing and weathering, plasticisers, and fungistatic and bacteriostatic acting substances, and also fillers such as barium sulfate, diatomaceous earth, carbon black or precipitated chalk.

Further examples of surface-active additives and foam stabilisers that may optionally be co-used according to the invention, as well as cell regulators, reaction retardants, stabilisers, flame-inhibiting substances, plasticisers, dyes and fillers and also fungistatic and bacteriostatic acting substances, as well as details of the use and mode of action of these additives are described in Vieweg und Höchtlen (Editors): Kunststoff-Handbuch, Vol. VII, Carl-Hanser-Verlag, Munich 1966, pp. 103–113.

Blowing agent components that may optionally be used are all known blowing agents in polyurethane foam production. Suitable organic blowing agents include for example acetone, ethyl acetate, halogen-substituted alkanes such as methylene chloride, chloroform, ethylidene chloride, vinylidene chloride, monofluorotrichloromethane, chlorodifluoromethane, dichlorodifluoromethane, and also butane, hexane, heptane or diethylether, while suitable inorganic blowing agents are for example air, $CO_2$ or $N_2O$. A blowing action can also be achieved by adding compounds that decompose at temperatures above room temperature with the release of gases, for example nitrogen, examples of such compounds being azo compounds such as azo dicarbonamide or azo isobutyronitrile. Particularly preferred as blowing agents are hydrogen-containing fluoroalkanes (HCFCs) as well as lower alkanes such as for example butane, pentane, isopentane, cyclopentane, hexane, isohexane, optionally mixed with one another and/or with the addition of water. Further examples of blowing agents as well as details of their use are described in Vieweg und Höchtlen (Editors): Kunststoff-Handbuch, Vol. VII, Carl- Hanser Verlag, Munich 1966, pp. 108 et seq., pp. 453 et seq., and pp. 507 et seq. However, it is preferred to use water or $CO_2$ as the sole blowing agent.

In order to carry out the process according to the invention the reaction components are reacted according to the one-stage process known per se, the prepolymer process or the semi-prepolymer process, wherein mechanical equipment such as described in U.S. Pat. No. 2,764,565 is preferably used. Details of processing equipment that may also be used according to the invention are given in Vieweg und Höchtlen (Editors): Kunststoff-Handbuch, Vol. VII, Carl-Hanser-Verlag, Munich 1966, pp. 121 to 205.

In the production of the foam the foaming may also be carried out according to the invention in closed moulds. For this, the reaction mixture is added to a mould, suitable mould materials being metals, for example aluminium, or plastics materials, for example epoxide resin. The foamable reaction mixture foams in the mould and forms the moulded article. The mould foaming may be carried out in such a way that the surface of the moulded part has a cellular structure. The foaming may however also be carried out so that the moulded part has a complete skin and a cellular core. According to the invention, in this connection the foaming may be carried out in such a way that sufficient foamable reaction mixture is added to the mould so that the foam that is formed just fills the mould. Alternatively however, more foamable reaction mixture may be added to the mould than is necessary to fill the interior of the mould with foam. In the latter case the process is carried out under so-called "over-charging" conditions; such a procedure is known for example from U.S. Pat. No. 3,178,490 and U.S. Pat. No. 3,182,104.

In the mould foaming process, in many cases "external release agents" known per se, such as silicone oils, are co-used. However, so-called "internal release agents" may also be used, optionally mixed with external release agents, as is disclosed for example in DE-OS 21 21 670 and DE-OS 23 07 589.

Obviously, foamed materials may however also be produced by block foaming or by the double conveyor belt process known per se (see "Kunststoffhandbuch", Vol. VII, Carl Hanser Verlag, Munich, Vienna, $3^{rd}$ Edition 1993, p. 148).

The foamed materials may be produced by various processes used in the production of block foams, but also in moulds. In the production of block foams, in a preferred embodiment of the invention polyether polyols are used that contain EO/PO mixed blocks with a PO proportion of at least 50 mole %, preferably at least 60 mole %; in addition they may also contain terminal PO blocks. If very flexible foams are to be produced, then polyether polyols are used that contain EO/PO mixed blocks with a large proportion of oxyethylene units; preferably these polyols also have a large proportion of primary OH groups (preferably at least 40 mole %, particularly preferably at least 50 mole %). In this connection these polyether polyols may be used in combination with conventionally produced polyols containing a large proportion of primary OH groups. In order to produce hot-cured moulded foams polyether polyols are preferably used containing at least one internal EO/PO mixed block and terminal PO block, while for the production of cold-cured moulded foams polyether polyols with a terminal EO/PO mixed block and a proportion of primary OH groups of more than 40 mole %, in particular more than 50 mole %, have proved particularly suitable.

EXAMPLES

Production of the DMC Catalyst (According to EP-A 700 949).

A solution of 12.5 g (91.5 mmole) of zinc chloride in 20 ml of distilled water is added while stirring vigorously (24,000 revs/min) to a solution of 4 g (12 mmole) of potassium hexacyanocobaltate in 70 ml of distilled water. Immediately thereafter a mixture of 50 g of tert.-butanol and 50 g of distilled water is added to the resultant suspension and the whole is then vigorously stirred for 10 minutes (24,000 revs/min). A mixture of 1 g of polypropylene glycol with a mean molecular weight of 2,000, 1 g of tert.-butanol and 100 g of distilled water is then added and stirred for 3 minutes (1,000 revs/min). The solids are removed by filtration, then stirred for 10 minutes (10,000 revs/min) with a mixture of 70 g of tert.-butanol, 30 g of distilled water and 1 g of the above polyether, and refiltered. Finally, the product is stirred once more (10,000 revs/min) for 10 minutes with a mixture of 100 g of tert.-butanol and 0.5 g of the above polyether. After filtration the catalyst is dried to constant weight at 50° C. and under normal pressure.

Yield of dried, pulverulent catalyst: 6.23 g

Elementary analysis and thermogravimetric analysis:

Cobalt=11.6 wt. %, zinc=24.6 wt. %, tert.-butanol=3.0 wt. %, polyether=25.8 wt. %

Production of Polyether Polyols

Example 1

746.7 g of a poly(oxypropylene)triol starter compound (hydroxyl number=431 mg KOH/g) that had been produced from glycerol and propylene oxide by yttrium triflate catalysis (100 ppm) without separation of the catalyst, and 0.6 g of DMC catalyst (100 ppm, referred to the amount of the long-chain polyol to be produced) are placed under a protective gas (nitrogen) in a 10 L capacity glass pressure flask and heated to 105° C. while stirring. Propylene oxide (ca. 100 g) is then added in one go until the total pressure has risen to 1.5 bar. Further propylene oxide is then added only when an accelerated drop in pressure is observed. This accelerated drop in pressure indicates that the catalyst is activated. The residual propylene oxide (3,408.4 g) is then continuously metered in at a constant overall pressure of 1.5 bar. After adding all the propylene oxide and a post-reaction time of 5 hours at 105° C., 581.6 g of ethylene oxide and 1,163.2 g of propylene oxide are added in a mixed block at temperatures of 100–110° C. After a post-reaction time of 5 hours volatile fractions are distilled off at 105° C. (1 mbar), following which the contents are cooled to room temperature and 6 g of an antioxidant (3,5-ditert.-butyl-4-hydroxytoluene, BHT) are added.

The long-chain polyether polyol obtained has an OH number of 54.7 mg KOH/g and a double bond content of 7 mmole/kg.

Example 2

As Example 1, but instead using 1,182.0 g of propylene oxide, a mixed block of 581.6 g of ethylene oxide and 2,326.5 g of propylene oxide, and a terminal block of 1,163.2 g of propylene oxide.

The product has an OH number of 54.4 mg KOH/g and a double bond content of 8 mmole/kg.

Example 3

872.7 g of a poly(oxypropylene)triol starter compound (hydroxyl number=380 mg KOH/g) that has been produced by KOH catalysis from TMP and propylene oxide, and 0.3 g of DMC catalyst (50 ppm, referred to the amount of the long-chain polyol to be produced) are added under a protective gas (nitrogen) to a 10 L capacity glass pressure flask and heated to 105° C. while stirring. A mixture of propylene oxide (541.3 g) and ethylene oxide (4,586.0 g) is then continuously added at a constant overall pressure of 1.5 bar. After a post-reaction time of 5 hours volatile fractions are distilled off at 105° C. (1 mbar), following which the contents are cooled to room temperature and 6 g of an antioxidant (3,5-ditert.-butyl-4-hydroxytoluene, BHT) are added.

The long-chain polyether polyol obtained has an OH number of 58.5 mg KOH/g and a double bond content of 2 mmole/kg.

Example 4

As Example 3, but with a mixed block consisting of 4,614.6 g of propylene oxide and 512.7 g of ethylene oxide.

The long-chain polyether polyol obtained has an OH number of 58.1 mg KOH/g and a double bond content of 7 mmole/kg.

Example 5

As Example 3, but with a mixed block consisting of 3,589.1 g of ethylene oxide and 1,538.2 g of propylene oxide.

The product has an OH number of 59.1 mg KOH/g and a double bond content of 2 mmole/kg.

Example 6

As Example 3, but with a mixed block consisting of 1,719.8 g of ethylene oxide and 3,407.4 g of propylene oxide.

The product has an OH number of 58.5 mg KOH/g and a double bond content of 4 mmole/kg.

Comparison Example 1

746.7 g of a poly(oxypropylene)triol starter compound (hydroxyl number=431 mg KOH/g) that has been produced from glycerol and propylene oxide by yttrium triflate catalysis (100 ppm) without separation of the catalyst, and 0.6 g of DMC catalyst (100 ppm, referred to the amount of the long-chain polyol to be produced) are placed under a protective gas (nitrogen) in a 10 L capacity glass pressure flask and heated to 105° C. while stirring. Propylene oxide (ca. 100 g) is then added in one go until the overall pressure has risen to 1.5 bar. Further propylene oxide is then added only when an accelerated drop in pressure is observed. This accelerated drop in pressure indicates that the catalyst is activated. The residual propylene oxide (5,153.3 g) is then continuously added at a constant overall pressure of 1.5 bar. After adding all the propylene oxide and a post-reaction time of 5 hours at 105° C., volatile fractions are distilled off at 105° C. (1 mbar), and the contents are then cooled to room temperature.

The long-chain polyether polyol obtained has an OH number of 54.4 mg KOH/g and a double bond content of 10 mmole/kg.

Production of Flexible Polyurethane Foams
Production of the Flexible Foams:
Free Foam
a) Cold-Cured Moulded Foam The polyol formulation is weighed out according to the formulation instructions on high-speed laboratory scales. In this connection the corresponding polyether (optionally polyether mixture) is added to the conventional laboratory cardboard beaker provided for this purpose and heated to 25° C. After briefly swirling the contents all the necessary additives according to the formulation details are added. After the polyether formulation has been heated to 25° C., the sample is stirred for 30 seconds using an LM-34 stirrer at maximum speed (4,200 revs/min) in order to produce a homogeneous mixture and to ensure a uniform charging with air. In this connection care should be taken to ensure that the stirrer tray does not touch the sheet metal floor of the vessel.

The isocyanate/isocyanate mixture heated to 25° C. is weighed out according to the quantitative instructions on high-speed laboratory scales and added to a suitable beaker. The thus previously prepared quantity of isocyanate is added to the reaction vessel together with the polyether formulation. In this connection care should be taken to ensure that the outflow time of the isocyanate component is about 3 seconds. The components are then stirred in the reaction vessel by means of an LM-34 stirrer at 4,200 revs/min. When the mixture has assumed a creamy consistency (starts to rise), part of the reaction mixture is immediately transferred to a small paper packet stabilised by means of a wooden box.

Starting time is the period from the beginning of the mixing stage up to the clearly recognisable start of the reaction.

The setting time ("thread drawing time") is a measure of the polymer formation reaction, and is determined by repeatedly inserting a thin round wooden rod into the rising reaction mixture shortly before the expected setting time (empirical value).

The time period from the start of mixing up to the time at which threads (TDI or TDI/MDI systems) or pocks (MDI systems) form or remain hanging when the round wooden rod is withdrawn, is taken as the setting time.

The rise time is understood to be the time period between the start of mixing and the maximum vertical foam height.
b) Hot-Cured Foam Polyether, water, activator and stabiliser are mixed for 30 seconds (LM-34 stirrer, 4,200 revs/min), following which the crosslinking agent (tin octoate SO) is weighed out and mixed with the reaction mixture. The calculated quantity of isocyanate is then added to the reaction vessel together with the polyether formulation. In this connection care should be taken to ensure that the outflow time of the isocyanate component is about 3 secs. The components are then stirred in the reaction vessel with an LM-34 stirrer at 4,200 revs/min.

When the mixture has assumed a creamy consistency (starts to rise), part of the reaction mixture is immediately transferred to a small paper packet stabilised by means of a wooden box.

Starting time is the period from the beginning of the mixing stage up to the clearly recognisable start of the reaction.

Rise time: the term rise time is understood to mean the interval between the start of mixing and the maximum vertical foam height. With hot-cured foams a deflation is also observed.

30 seconds after the end of the rise time the small packet is placed in a cabinet heated at 150° C. Residence time 5 min.

Moulded Part (Cold-Cured Moulded Foam)

The reaction mixture is transferred to a mould (mould temperature 50–60° C.) that is provided with a commercially available release agent. The mould is closed with a cover and transferred to a press or closeable container in order to counteract the foam pressure and to keep the tool closed. After 5 minutes the cover is removed and the foam is processed by mechanical crushing (for example by hand, with punches or rollers or by pressure reduction) until the foam has an open-cell structure (shrinkage-free).

Moulded Part (Hot-Cured Moulded Foam)

The reaction mixture is transferred to a mould (mould temperature 40–45° C.) and the mould is closed with a perforated cover.

30 seconds after the end of the rise time (deflation) the mould is placed in the heated cabinet at 150° C. Residence time 15 min.

After removal from the heated cabinet the hot mould is sprayed with release agent (Acmos® 32-574, Acmos Chemie GmbH & Co., D-28199 Bremen).

Comparison Example 2

100 parts by weight of the polyether from Comparison Example 1
3.0 parts by weight water
0.5 parts by weight silicone stabiliser
    (OS ® 15, Th. Goldschmidt AG, D-45127 Essen)
0.1 parts by weight N,N'-dimethylethanolamine (DMEA)
0.05 parts by weight amine catalyst (Niax ® A1, Witco Osi)
0.34 parts by weight tin octoate
35.6 parts by weight toluylene diisocyanate (65 wt. % 2,4-isomer, 35 wt. % 2,6-isomer; Desmodur ® T 65, Bayer AG)

were thoroughly mixed and foamed to form a foam. The block exhibited a horizontal internal crack that could not be rectified either by varying the tin catalyst (0.24–0.38 part by weight) or by the NCO/OH ratio (characteristic number 102–108).

Example 7

100 parts by weight of the polyether from Example 4
4.0 parts by weight water
0.4 parts by weight silicone stabiliser
    (OS ® 25, Th. Goldschmidt AG, D-45127 Essen)
0.1 parts by weight DMEA
0.05 parts by weight amine catalyst (Niax ® A1, Witco Osi)
0.18 parts by weight tin octoate
51.2 parts by weight toluylene diisocyanate (80 wt. % 2,4-isomer, 20 wt. % 2,6-isomer; Desmodur ® T 80, Bayer AG)

were thoroughly mixed and foamed to form a foam block. A crack-free, open foam with a regular cell structure was obtained.

Example 8

100 parts by weight of the polyether from Example 6
4.0 parts by weight water
0.4 parts by weight silicone stabiliser
    (OS ® 25, Th. Goldschmidt AG, D-45127 Essen)
0.1 parts by weight DMEA
0.05 parts by weight amine catalyst (Niax ® A1, Witco Osi)
0.18 parts by weight tin octoate
51.2 parts by weight Desmodur ® T 65 were thoroughly mixed and foamed to form a foam block. A crack-free foam having a regular cell structure was obtained.

Example 9

In a formulation for producing super-flexible qualities, the polyether from Example 5 was foamed as a mixture with an active conventional polyether:

75 parts by weight of the polyether from Example 5
25 parts by weight of a trifunctional polyether with an OH number of 35 mg KOH/g and primary OH groups > 80 mole % (Desmophen ® 3900 I, Bayer AG)
3.50 parts by weight water
0.8 parts by weight silicone stabiliser
    (OS ® 15, Th. Goldschmidt AG, D45127 Essen)
0.7 parts by weight DMEA
0.25 part by weight amine catalyst (catalyst 33LV from Air Products GmbH, D-45527 Hattingen)
2.0 parts by weight TCPP (trichloropropyl phosphate)
45.4 parts by weight Desmodur ® T 80 were thoroughly mixed and foamed to form a foam block. A very flexible, elastic, crack-free foam with a regular cell structure was obtained.

Example 10

100 parts by weight of the polyether from Example 2
3.0 parts by weight water
0.8 parts by weight silicone stabiliser
    (OS ® 22, Th. Goldschmidt AG, D-45127 Essen)
0.1 parts by weight DMEA
0.05 parts by weight amine catalyst (Niax ® A1, Witco Osi)
0.18 parts by weight tin octoate
40.5 parts by weight Desmodur ® T 80 were thoroughly mixed and foamed to form a foam block. A crack-free foam was obtained.

Example 11

Cold-Cured Free Foam

Formulation:

| | |
|---|---|
| 50.0 parts by weight | of the polyether from Example 1 |
| 50.0 parts by weight | of a trifunctional polyether with an OH number of 28 mg KOH/g and > 80 mole % of primary OH groups (Desmophen ® VP PU 10WF22, Bayer AG) |
| 3.6 parts by weight | water |
| 0.15 parts by weight | amine catalyst (Niax ® A1, Witco Osi) |
| 0.4 parts by weight | amine calalyst (catalyst 33LV from Air Products GmbH, D-45527 Hattingen) |
| 1.25 parts by weight | diethanolamine |
| 0.50 parts by weight | silicone stabiliser (Tegostab ® B 8708, Th. Goldschmidt AG, D-45127 Essen) |
| 62.8 parts by weight | high monomer content 4,4'-diphenylmethane diisocyanate with polymer fractions and an NCO content of 32.3 wt. % (VP PU Desmodur ® 3230, Bayer AG) |

A high quality free foam was obtained.

Example 12

Hot-Cured Moulded Foam

Formulation:

| | |
|---|---|
| 100.0 parts by weight | of the polyether from Example 2 |
| 3.5 parts by weight | water |
| 0.05 parts by weight | tin octoate |
| 0.15 parts by weight | amine catalyst (Niax ® A1, Witco Osi) |
| 1.0 parts by weight | silicone stabiliser (Tegostab ® B 4900, Th. Goldschmidt AG, D-45127 Essen) |
| 62.8 parts by weight | Desmodur ® T 80 |

Figure 2:
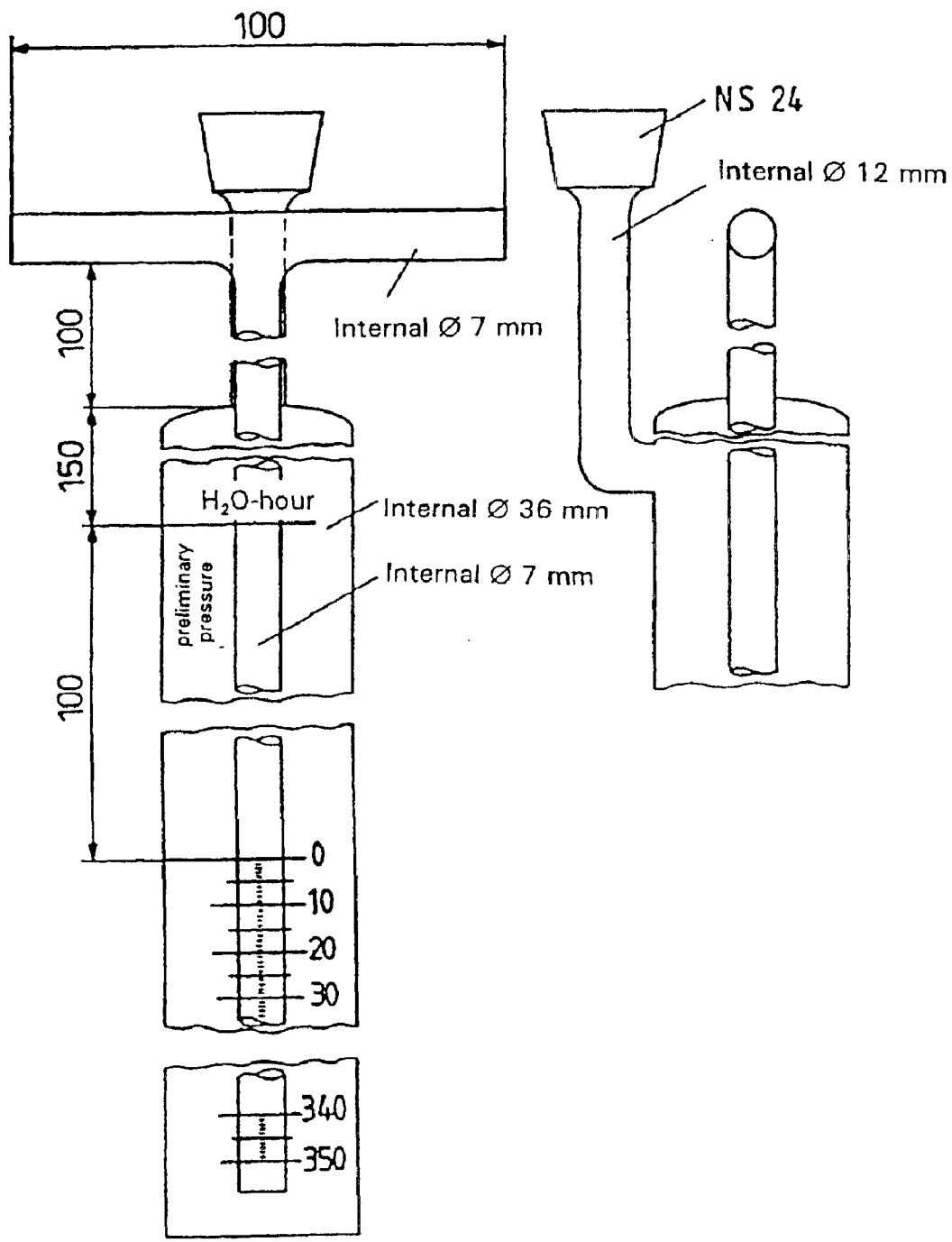
FIG. 2 illustrates in detail the glass flow vessel of the apparatus shown in FIG. 1.
Figure 3:
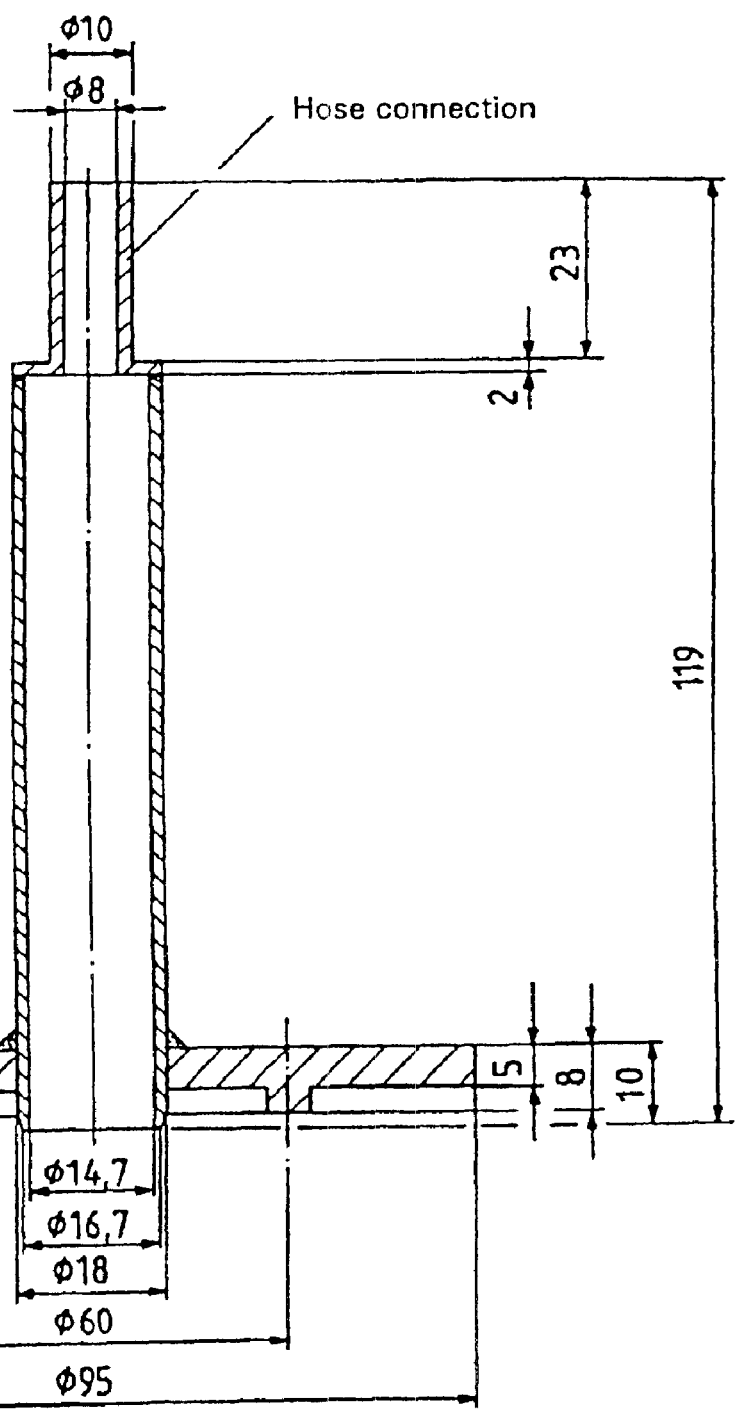
FIG. 3 illustrates in detail the measuring head of the apparatus shown in FIG. 1.

A high quality moulded foam was obtained. In order to determine the air permeability of the foam, its flow resistance to an air stream was measured with the apparatus illustrated in FIGS. 1–3.

The apparatus consists of a glass cylinder graduated in millimeters from 0 to 350, whose internal diameter is 36 mm, and an inner tube of 7 mm internal diameter. This inner tube terminates at the top in a T-piece, to one side of which is connected an air supply and to the other side of which is connected a hose with a measuring head. The hose for the measuring head has an internal diameter of 12 mm and a length of 1.80 m. The glass cylinder is closed at the bottom and can be filled with water via a funnel connected at the rear. The test equipment is connected via two stopcocks, a pressure-reducing valve and a hose of suitable length and suitable diameter to a compressed air source, the pressure-reducing valve being adjusted to ca. 2.0 bar. The glass vessel is filled with distilled water until the lower edge of the meniscus reaches the $H_2O$-hour mark. Stopcock 1 is then turned and the flow rate at stopcock 2 is altered until the lower edge of the meniscus of the inner column reaches the 0 mm mark, indicating that a preliminary pressure of 100 mm water column has been set. After the setting of the preliminary pressure the measuring head is placed without pressure on the sample and the height of the water column in the inner tube is then read off. This is equal to the flow resistance of the sample.

The following values were determined: flow resistance of the foam core: 100 mm water column; flow resistance of the foam plus skin: 300 mm water column.

Example 13

Hot-Cured Moulded Foam

Formulation

| | |
|---|---|
| 100 parts by weight | of the polyether from Example 1 |
| 3.5 parts by weight | water |
| 0.15 parts by weight | amine catalyst (Niax ® A1, Witco Osi) |
| 0.10 parts by weight | tin octoate |
| 0.50 parts by weight | silicone stabiliser (Tegostab ® B 4900, Th. Goldschmidt AG, D-45127 Essen) |
| 40.6 parts by weight | Desmodur ® T 80 |

A high quality moulded foam was obtained. The flow resistance of the sample was determined according to the procedure described in Example 12. The following values were measured: flow resistance of the foam core: 50 mm water column; flow resistance of the foam plus skin: 160 mm water column.

Example 14

Hot-Cured Moulded Foam

| | |
|---|---|
| 30.0 parts by weight | of the polyether from Example 1 |
| 70.0 parts by weight | Desmophen ® 3426 L |
| 3.5 parts by weight | water |
| 0.09 parts by weight | tin octoate |
| 1.00 parts by weight | silicone stabiliser (Tegostab ® B 4900, Th. Goldschmidt AG, D-45127 Essen) |
| 40.6 parts by weight | Desmodur ® T 80 |

A high quality moulded foam was obtained.

What is claimed is:

1. A flexible polyurethane foam which is the reaction product of
   (1) a polyisocyanate with
   (2) an isocyanate-reactive component comprising a polyether polyol produced by alkoxylation in the presence of a double metal cyanide catalyst having a terminal propylene oxide block, containing at least one ethylene oxide/propylene oxide mixed block and having a number average molecular weight of from 700 to 50,000 g/mole.
2. The foam of claim 1 which is a hot cured molded foam.
3. The foam of claim 1 which is a slabstock foam.
4. The foam of claim 3 in which at least 50 mole % of the ethylene oxide/propylene oxide mixed block of the polyether polyol comprises polyoxypropylene units.

* * * * *